Aug. 3, 1965 D. GABOR 3,198,067
OPTICAL RECORDING-REPRODUCING SCANNING SYSTEM
Filed April 12, 1962

INVENTOR.
DENNIS GABOR
BY
ATTORNEYS

United States Patent Office 3,198,067
Patented Aug. 3, 1965

3,198,067
OPTICAL RECORDING-REPRODUCING
SCANNING SYSTEM
Dennis Gabor, London, England, assignor to Columbia
Broadcasting System, Inc., New York, N.Y., a corporation of New York
Filed Apr. 12, 1962, Ser. No. 187,025
7 Claims. (Cl. 88—24)

This invention relates to optical devices and, more particularly, to an optical device for producing two side-by-side images of a single object.

The invention finds particular application in the recording of television images from a television picture tube directly on continuously moving photographic film, wherein it is desirable to record in a single frame on the film two successive interlaced scansions or fields of the moving spot of light that sweeps across the face of the tube. Similarly, the invention finds application in the reproduction of a film record upon which a television program is recorded in this fashion, wherein a single frame on a continuously moving film is scanned twice to effect two interlaced scansions of the frame.

So-called "film chasing" systems are known. A typical conventional system for reproducing pictures recorded on film may include, for example, a pair of spaced mirrors, each of which reflects light to a scanning disk. Through the use of further side-by-side mirror arrangements and a common lens system, each viewing mirror views a different portion of a scanning area adjacent to a moving film. By alternately masking the two side-by-side mirrors during successive scansions of the scanning disk, the two portions of the scanning area are scanned successively, and, since the film is moving, a single portion or frame of the moving film is scanned thereby.

A disadvantage with such an arrangement is that the side-by-side mirrors must be tilted to allow the two focal paths of the two viewing mirrors to include the common lens system. This results in a tilting of the two successive images, which in turn produces poor focusing, and is an undesirable feature of such a system. Additionally, each mirror operates only with one-half of the common lens system, another undesirable feature.

The present invention overcomes these problems by providing a recording-reproducing system incorporating a pair of spaced prism or mirror arrangements, each of which views the face of a cathode ray tube and each of which is alternately masked during successive scansions of the light spot across the face of the tube. The rays of light from the two mirror arrangements are made to travel in directions which are substantially perpendicular to each other and which converge upon the same central area. Positioned in the central area is a semi-reflecting and semi-transmitting, beam-splitting prism. As a result, one-half the light from each mirror arrangement, i.e., the light from one mirror arrangement that is reflected by the beam-splitting prism and the light from the other mirror ararngement that is transmitted by the beam-splitting prism, is made to travel in the same direction through a common lens arrangement to impinge upon a scanning area adjacent to the moving film. The light from each viewing mirror impinges upon a different portion of the scanning area, and, since the mirrors are alternately masked during scansions across the face of the cathode ray tube, a single frame on the moving film is scanned twice as it moves through the scanning area. Because of the use of the beam-splitting prism, no tilting of images is involved. Further, the system provides optical paths which are equal in length for the images formed by the viewing mirror arrangements.

A detailed description follows of the invention described in general terms above, which is to be read in conjunction with the appended drawing in which.

Figure 1:
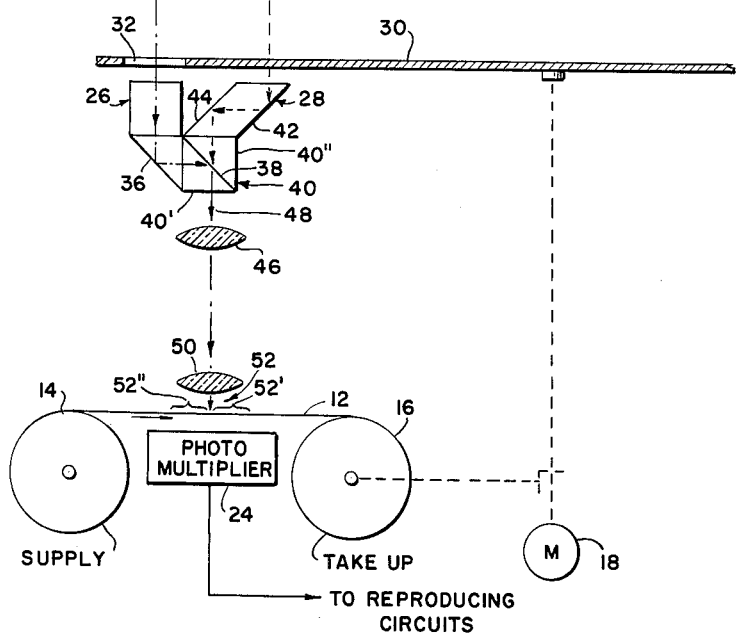
FIG. 1 is a view of a film chasing system in accordance with the invention.

Referring to FIG. 1, a photographic film 12 is conveyed from a supply reel 14 to a take-up reel 16 driven by a motor 18. The film 12 may be unexposed, in which case an intensity modulated spot of light scanning across face 20 of a cathode ray tube 22 to produce a television picture thereon is to be "exposed" on the film, or the film may be already exposed, in which case it contains a series of frames of pictures which are to be scanned by a spot of light of constant intensity from the cathode ray tube 22 to generate signals in a photomultiplier 24. In either case, the film chasing apparatus of the present invention is the same and includes the following features.

A pair of prisms 26 and 28 are disposed opposite the face 20 of the cathode ray tube 22. The field of view of the prism 26 is such that it encompasses at least the areas indicated as a and b in FIG. 1. Similarly, the field of view of the prism 28 is such that it encompasses at least the areas b and c. In this case, a and c are blacked out or darkened areas adjacent to the portion b of the face 20 of the cathode ray tube 22, the portion b representing the extent of the raster of the spot of light that sweeps across the face 20. The areas a, b, and c are all of equal extent.

Figure 2:
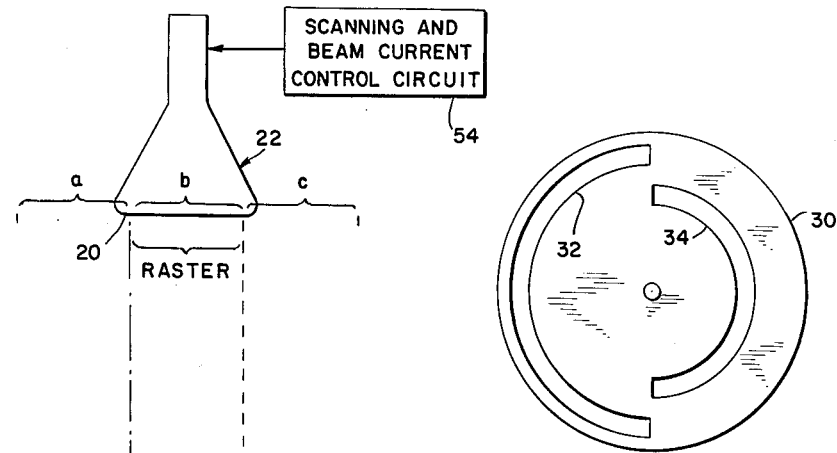
FIG. 2 is a reduced view of a shutter used in the apparatus of FIG. 1.

A rotating shutter 30 driven by the motor 18 alternately unmasks the prisms 26 and 28 during successive scansions of the spot of light across the face 20 of the cathode ray tube 22. As may be seen from FIG. 2, the shutter 30 is an opaque disk having a pair of slits 32 and 34 therein. When the slit 32 unmasks the prism 26, the prism 28 is masked; and similarly, when the slit 34 unmasks the prism 28, the prism 26 is masked. The rotation of the shutter 30 is chosen so that one revolution thereof corresponds to two successive fields or scansions of the light spot across the face 20 of the cathode ray tube.

The prism 26 includes a toally reflecting surface 36 which reflects the light rays from the cathode ray tube face 20 in substantially a first direction, as shown by the arrows in FIG. 1, and directs them towards a semi-reflecting and semi-transmitting surface 38 of a beam-splitting prism 40. The prism 28 has two totally reflecting surfaces 42 and 44 which reflect the light from the cathode ray tube face 20 in substantially a second direction perpendicular to the first direction, as shown by the arrows, and direct the reflected light toward the semi-reflecting and semi-transmitting surface 38.

The beam-splitting prism 40 may comprise two prisms 40' and 40" having faces which are joined together to form the semi-reflecting and semi-transmitting surface 38. To elaborate, a fine checkerboard pattern is etched upon a face of the prism 40', only about one-half a light wavelength or one-quarter micron deep, for example. This etched prism face is united by optical union with a face of the prism 40" by being heated to 150° centigrade under pressure, for example, to form the surface 38. If a 10 x 10 checkerboard pattern is etched on a square prism surface of approximately 100 mm.$^2$, the slightly slanting edges of the etched surface will have an area of approximately 1/20 mm.$^2$, which is 0.05% of the total area. The diffusion created by this generally is negligible. For such a prisim 40 formed in the fashion just described, heavy barium-crown glass provides a good prism material since it has both the high refractive index necessary for total reflection in the whole angular range and the advantage of etching very smoothly and evenly.

One-half the light from the prism 26 is reflected by the semi-reflecting and semi-transmitting surface 38 to pass downwardly through the prism 40' to a lens 46. The other half of the light from the prism 26 is transmitted through the surface 38 to pass outwardly through the prism 40''. Similarly, one-half the light from the prism 28 is transmitted through the semi-reflecting and semi-transmitting surface 38 to pass downwardly through the prism 40' to the lens 46, while the other half of the light is reflected by the surface 38 outwardly through the prism 40''. The area 48 between the lens 46 and the prism 40, thus, may be considered to be a common light corridor through which one-half the light from each of the prisms 26 and 28 passes to the lens 46.

The light rays passing through the lens 46 pass through an additional lens 50 which focuses the rays upon a scanning area 52 adjacent to the film strip 12.

The system operates as follows. When the slit 32 of the rotating shutter 30 unmasks the prism 26, and the prism 28 is masked, the prism 26 views the areas $a$ and $b$. The area $b$, of course, is that portion of the cathode ray tube face 20 upon which the moving spot of light in the cathode ray tube 22 completes its scanning raster. The area $a$ is a blacked out or darkened area from which no light emanates. The total light from the areas $a$ and $b$ is reflected by the totally reflecting surface 36 in the prism 26 toward the semi-transmitting and semi-reflecting surface 38 of the beam-splitting prism 40. Half of these light rays are, accordingly, transmitted through the surface 38 and outwardly through the prism 40'', while the other half of the rays are reflected downwardly by the surface 38 and through the prism 40' to the lenses 46 and 50, which focus the rays on the area 52 adjacent to the film strip 12. Specifically, rays of light from the area $a$ are focused upon a portion 52' of the scanning area 52, while rays of light from the area $b$ are focused upon a portion 52'' of the scanning area 52. However, since rays of light in fact only emanate from the area $b$, the area $a$ being completely darkened, the raster of the moving spot of light produced by the cathode ray tube 22 is the only light that is directed to the scanning area 52.

During the remaining one-half revolution of the shutter 30 when the slit 34 unmasks the prism 28, and the prism 26 is masked, the prism 28 views the areas $b$ and $c$. The area $c$, like the area $a$, is a blacked out or darkened area from which no light emanates. The total light from the areas $b$ and $c$ is reflected by the totally reflecting surfaces 42 and 44 and is directed downwardly toward the semi-reflecting and semi-transmitting surface 38 of the beam-splitting prism 40. One-half of these rays of light are reflected by the surface 38 outwardly through the prism 40'', while the other half of the rays are transmitted through the surface 38 and the prism 40' to the lenses 46 and 50, which focus the rays on the scanning area 52. In this instance, however, the rays of light from the area $b$ are focused on the portion 52' of the scanning area 52, while any rays of light from the area $c$ would be focused on the portion 52'' of the scanning area. However, since the area $c$ is darkened and no light emanates therefrom, the light from the scanning light spot in the cathode ray tube 22 is the only light directed to the scanning area 52.

In this fashion, as the film 12 moves from the supply reel 14 to the take-up reel 16, a scanning raster from the area $b$ on the face 20 of the cathode ray tube 22 is first imaged upon the portion 52'' of the scanning area 52, and the next complete raster is imaged on the portion 52' of the scanning area. By suitably synchronizing the movement of the film 12, the shutter 30, and the scanning of the light spot, the film is effectively "chased," so that each frame thereon is scanned twice as it passes through the scanning area 52; namely, once in the portion 52'' and once in the portion 52'. In this respect it should be noted that the scanning raster of the light spot is actually of such an extent as to encompass by itself only one-half a frame on the film 12. However, because of the movement of the film 12, this movement, together with the movement of the light spot, produces an effective scanning of the entire frame on the film.

As may be noted, because of the use of a beam-splitting prism, no tilting of images is involved. Further, each of the prisms 26 and 28 operates with all of, as distinguished from one-half of, the lenses 46 and 50. Finally, the optical lengths of the light paths through the prisms 26 and 40, on the one hand, and 28 and 40, on the other hand, are equal.

When the system of FIG. 1 is used to record television pictures appearing upon the face 20 of the cathode ray tube 22, the intensity of the light spot in the cathode ray tube is controlled by a scanning and beam current control circuit 54 so that it is intensity modulated to produce the pictures on the cathode ray tube face. Thus, as the raster fo the light spot is imaged upon the film 12, the light "exposes" the film to record the television picture thereon.

On the other hand, when the system of FIG. 1 is used as a reproducing system to reproduce television information contained on a film record, the light spot in the cathode ray tube 22 is controlled by the scanning and beam current control circuit 54 so that it is of constant intensity as it sweeps across the face 20 of the tube in its scanning raster. In this case, the raster of the light spot is imaged upon the film 12, and the photo-multiplier 24 detects the light transmitted through the film and develops a signal which is applied to reproducing circuits (not shown) to generate signals suitable for application to television receivers and the like to reproduce the pictures appearing upon the frames of the film 12.

With the arrangement shown, it is advisable not to change the extent of the raster of the light spot on the cathode ray tube face 20, but, rather, to keep it constant and equal to the distance between the axes of the prisms 26 and 28. In this case, film shrinkage is compensated for by additional lenses (not shown), such as an "afocal" or "telescopic" pair of lenses with variable spacing, for example, which vary the magnification without varying the focus.

As may be noted, a novel optical device has been provided which produces two side-by-side images of an object. Although the device has been described with reference to a film chasing system and, further, is susceptible of modification, the invention should not be deemed limited to the form specifically described, but should be determined, however, by reference to the following claims which are set forth to define the invention.

I claim:

1. In recording-reproducing apparatus in which a moving record medium is scanned in a scanning area, means for alternately scanning the record medium in at least two different portions of the scanning area, comprising
    (a) flying-spot tube means for generating successive scanning lines forming successive scanning patterns,
    (b) image-forming means having first and second light-flux-entrance means mounted for admitting light flux from said scanning patterns and forming first and second images on said medium at first and second portions respectively of said scanning area without unfocusing any portion of either of said first and second images, and
    (c) moving shutter means having a portion moving substantially in a plane perpendicular to the direction of film motion for alternately unblanking said first and second light-flux-entrance means.

2. In recording-reproducing apparatus in which a record medium moving through a scanning area is scanned in the scanning area, means for alternately scanning the record medium in at least two different portions of the scanning area, comprising
    (a) means for generating successive scanning rasters in a first area with a moving spot of light,
    (b) first means disposed substantially opposite one side of said first area for directing light from said first area to a second area, (c) second means disposed substantially opposite another side of said first area for directing light from said first area to the second area, (d) third means disposed in the second area for directing rays of light from the first and second means along a common light corridor, (e) lens means positioned in the light corridor for focusing the light passing therethrough on the scanning area, the light directed by said first and third means and the light directed by said second and third means passing through the same part of said lens means, and (f) means for alternately masking the first and second means during alternate scanning rasters.

3. In recording-reproducing apparatus in which a record medium moving through a scanning area is scanned in the scanning area, means for alternately scanning the record medium in at least two different portions of the scanning area, comprising (a) means for generating with a moving spot of light successive scanning rasters, (b) first means for viewing said rasters and a first area adjacent to one side of the rasters, (c) second means for viewing said rasters and a second area adjacent to a side of the rasters opposite from said one side, (d) means associated with the first means for directing in substantially a first direction rays of light from the first means to a central area, (e) means associated with the second means for directing in substantially a second direction substantially perpendicular to the first direction rays of light from the second means to the central area, (f) a semi-reflecting and semi-transmitting prism means positioned in the central area for directing predetermined portions of the light from said first and second means along a common light corridor, (g) lens means positioned in the light corridor for focusing the light passing therethrough on the scanning area, the light directed by the means associated with the first means and the semi-reflecting and semi-transmitting prism and the light directed by the means associated with the second means and the semi-reflecting and semi-transmitting prism passing through the same part of said lens means, and (h) means for alternately masking the first and second means during alternate scanning rasters.

4. In recording-reproducing apparatus in which a record medium moving through a scanning area is scanned in the scanning area, means for alternately scanning the record medium in at least two different portions of the scanning area, comprising (a) means for generating successive scanning rasters in a first area with a moving spot of light, (b) first means for reflecting light from said first area and a second area adjacent to one side of the first area substantially in a first direction to a central area, (c) second means for reflecting light from said first area and a third area adjacent to a side of the first area opposite from said one side substantially in a second direction substantially perpendicular to said first direction to said central area, (d) a beam-splitting prism positioned in the central area for reflecting substantially one-half of the light and transmitting the other half of the light therethrough from each of the first and second means, thereby to direct substantially one-half the light from the first and second means along a common corridor, (e) lens means positioned in the common corridor for focusing the light passing therethrough on the scanning area, the light reflected by the first means and directed along the corridor by the beam-splitting prism and the light reflected by the second means and directed along the corridor by the beam-splitting prism passing through the same part of said lens means, and (f) means for alternately masking the first and second means during alternate scanning rasters.

5. An optical device for producing two side-by-side images of said object.

(a) a common lens system, (b) first means for directing rays of light from an object and a darkened area adjacent to one side of the object to said common lens system, said common lens system focusing the light on the image plane, and (c) second means for directing rays of light from the object and a second darkened area adjacent to a side of the object opposite said one side to said common lens system, the rays of light from said first means and the rays of light from said second means passing through the same part of said common lens system.

6. In combination with apparatus as recited in claim 5

(d) means for alternately masking said first and second means, thereby to produce successive side-by-side images of said object.

7. An optical device for producing in an image plane two side-by-side images of an object, comprising (a) first means disposed opposite one side of said object for directing light from said object to a first area, (b) second means disposed opposite another side of said object for directing light from said object to said first area, (c) third means disposed in the first area for directing rays of light from the first and second means along a common light corridor, and (d) lens means positioned in the light corridor for focusing the light passing therethrough on the image plane, the light directed by the first and third means and the light directed by the second and third means passing through the same part of said lens system.

References Cited by the Examiner

UNITED STATES PATENTS

| 2,218,498 | 10/40 | Bunger et al. | 178—7.2 |
| 2,775,644 | 12/56 | Mandel | 178—7.2 |
| 2,817,265 | 12/57 | Covely. | |
| 2,928,895 | 3/60 | Day | 178—6.7 X |
| 3,014,090 | 12/61 | Bartley | 178—7.4 |

FOREIGN PATENTS 849,786 8/39 France.

NORTON ANSHER, *Primary Examiner.*

EMIL G. ANDERSON, *Examiner.*